United States Patent [19]

Warnock

[11] Patent Number: 5,185,818
[45] Date of Patent: Feb. 9, 1993

[54] METHOD OF SUBSTITUTING FONTS AND DISPLAYING CHARACTERS

[75] Inventor: John E. Warnock, Los Altos, Calif.

[73] Assignee: Adobe Systems Incorporated, Mountain View, Calif.

[21] Appl. No.: 710,603

[22] Filed: Jun. 5, 1991

[51] Int. Cl.$^5$ ............................................. G06K 9/40
[52] U.S. Cl. ..................................... 382/54; 340/735; 395/150; 395/151
[58] Field of Search ............................. 382/54, 41, 44; 340/735, 748; 395/150, 151

[56] References Cited

U.S. PATENT DOCUMENTS

| | | | |
|---|---|---|---|
| 4,400,697 | 8/1983 | Currie et al. | 340/735 |
| 4,586,835 | 5/1986 | Alexander et al. | 340/735 |
| 4,686,525 | 8/1987 | Nagata | 340/735 |
| 4,933,866 | 6/1990 | Markoff et al. | 340/735 |
| 5,018,217 | 5/1991 | Yoshida et al. | 382/54 |
| 5,018,883 | 5/1991 | Fujita | 340/735 |
| 5,107,259 | 4/1992 | Weitzen et al. | 340/735 |

Primary Examiner—Joseph Mancuso
Attorney, Agent, or Firm—Roger S. Borovoy

[57] ABSTRACT

The invention describes a method for reconstructing characters in a document, which are expressed in one or more fonts, to convert the characters to a different font designed to closely match characters from a plurality of fonts in an aesthetically pleasing manner. This is accomplished by first selecting a first character from the document and thereafter substituting for the first character the same character constructed from the different font and having the same width as the first character, the characters of varying widths within the different font being designed to have aesthetically pleasing relationships between their parts irrespective of width. The construction and substitution of characters of the different font for each of the characters in said document needing reconstruction is continued in the same manner until all the characters in the document needing reconstruction have been substituted, thereby creating a reconstructed document having an aesthetically pleasing relationship among the characters in the document. Thereafter the reconstructed document is stored, printed or displayed.

8 Claims, 3 Drawing Sheets hamburgerfons

*FIGURE 4A* hamburgerfons

*FIGURE 4B* hamburgerfons

*FIGURE 5A* hamburgerfons

*FIGURE 5B*

| NSC | TC1 | TC2 | TC3 | TC4 | TC5 | TC6 | TC7 | TC8 | WSC |
|-----|-----|-----|-----|-----|-----|-----|-----|-----|-----|
| a | a | a | a | a | a | a | a | a | a |
| b | b | b | b | b | b | b | b | b | b |
| c | c | c | c | c | c | c | c | c | c |
| d | d | d | d | d | d | d | d | d | d |
| e | e | e | e | e | e | e | e | e | e |
| f | f | f | f | f | f | f | f | f | f |
| g | g | g | g | g | g | g | g | g | g |
| h | h | h | h | h | h | h | h | h | h |
| i | i | i | i | i | i | i | i | i | i |
| j | j | j | j | j | j | j | j | j | j |
| k | k | k | k | k | k | k | k | k | k |
| l | l | l | l | l | l | l | l | l | l |
| m | m | m | m | m | m | m | m | m | m |
| n | n | n | n | n | n | n | n | n | n |
| o | o | o | o | o | o | o | o | o | o |
| p | p | p | p | p | p | p | p | p | p |
| q | q | q | q | q | q | q | q | q | q |
| r | r | r | r | r | r | r | r | r | r |
| s | s | s | s | s | s | s | s | s | s |
| t | t | t | t | t | t | t | t | t | t |
| u | u | u | u | u | u | u | u | u | u |
| v | v | v | v | v | v | v | v | v | v |
| w | w | w | w | w | w | w | w | w | w |
| x | x | x | x | x | x | x | x | x | x |
| y | y | y | y | y | y | y | y | y | y |
| z | z | z | z | z | z | z | z | z | z |

*FIGURE 6*

METHOD OF SUBSTITUTING FONTS AND DISPLAYING CHARACTERS

BACKGROUND OF THE INVENTION

The invention relates to a method of reconstructing a document in an aesthetically pleasing manner from data of an original document having many fonts.

DESCRIPTION OF THE RELEVANT ART

Many type designs have different character widths for each character. For example, such designs have narrow lower case "i"s and wide lower case "m"s. As designs vary, so do the widths and weights of the characters. These differences determine how many characters will fit on one line of text. Because fonts differ, so do these line settings.

One problem that comes up in digital document duplication and in electronic publishing is associated with the fact that the layout of a document is fundamentally dependent on the typefaces, or fonts used. Any differences in the fonts used will generally affect the line breaks on each line, the spacing between the lines and the amount of text that can fit on a given page. Most computers construct documents that depend on specific fonts, but the document structure available to the computer generally does not include the fonts themselves in order to save expensive memory storage space and transmission time. Many documents have multiple fonts, further exacerbating the problem. As a result, when documents are communicated from computer to computer, where the receiving computer does not have the correct fonts, the document cannot be printed to duplicate the original document In the prior art, several solutions were used to rectify this problem One solution develops font substitution strategies. For example the reconstructed document may be printed with fonts that approximate the original font This method does not work well because any differences between the original and the substituted fonts will cause errors in the page layout of the reconstructed document.

Another solution is to force the characters of a given substituting typeface to match the character widths of the original design. This method produces very unnatural character appearances in the printed document.

Therefore there exists a need in the electronic publishing industry to duplicate and transmit documents with high reliability, to match the width and weight of any desired font or fonts with aesthetically pleasing characters, and also to enable the duplication of an original document with a substituted font that will preserve all the metric information associated with the original. Such information may include stroke weight, character width, overall typeface weight and "x" height (x-height is the height of a lower case x, which is accepted as a standard font characteristic).

SUMMARY OF THE INVENTION

The invention provides a method for reconstructing characters in a document which are expressed in one or more fonts to convert the characters to a different font designed to closely match the desired metric information of characters from a plurality of fonts in an aesthetically pleasing manner. This is accomplished by first selecting a first character from the document. Thereafter, the same character, but constructed from a different font having the same width as the first character, is substituted for the first character. The characters of varying widths within the different fonts are designed to have aesthetically pleasing relationships between their parts irrespective of width. The construction and substitution of characters of the different font is continued, for each of the characters in the document needing reconstruction, in the same manner until all the characters in the document needing reconstruction have been substituted, thereby creating a reconstructed document having an aesthetically pleasing relationship among the characters in the document. Thereafter, the reconstructed document is stored, printed or displayed.

BRIEF DESCRIPTION OF THE DRAWINGS

FIGS. 4a and 4b illustrate some design differences between known fonts.

FIG. 5a illustrates a target word that was generated from source fonts stored in a computer memory to match the widths of the characters in the input word of FIG. 5b that uses the Helvetica font.

FIG. 6 illustrates the wide range capability of generating aesthetically pleasing fonts by the method of the present invention.

DETAILED DESCRIPTION OF THE INVENTION

Figure 1:
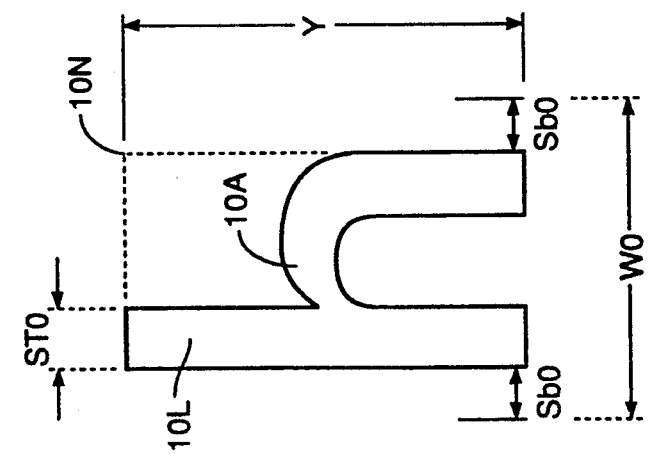
FIG. 1 illustrates a narrow character of a source font that is used to construct new intermediate wider fonts.

The preferred embodiment of the invention will now be described. FIG. 1 illustrates a narrow font "h" contained in a source document. The narrow source font "h" is included in a character bounding box 10N, and is drawn with a stroke thickness ST0. The narrow source font "h" also includes two side bearings sb0, one on each side of the letter "h", that bring the total width of the bounding box of the narrow source font "h" to W0.

Figure 3:
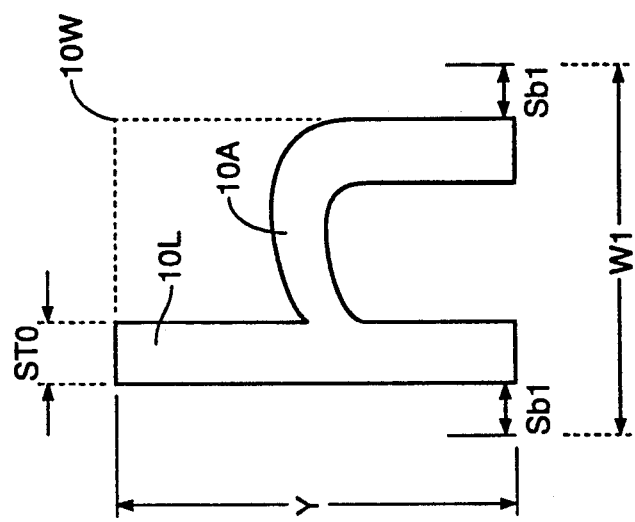
FIG. 3 illustrates a wide character of a source font that is used to construct new intermediate narrower fonts.

FIG. 3 illustrates a wide source font "h" of a source document. The wide source font "h" is included in a bounding box 10W and is drawn with the same stroke thickness, ST0, used for the narrow source font "h". The wide source font "h" also includes two side bearings sb1 on each side of the letter "h" that bring the total width of the bounding box of the wide source font "h" to W1.

Figure 2:
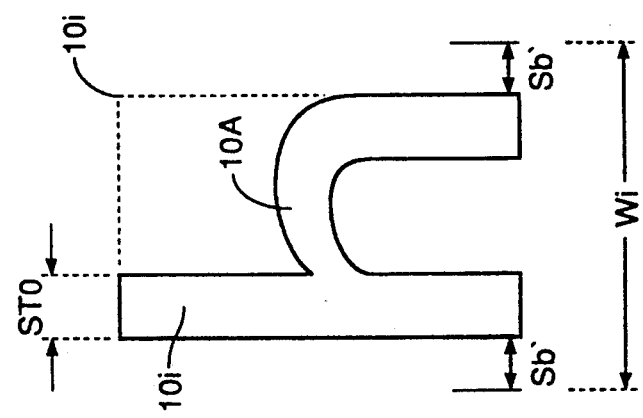
FIG. 2 is a character that is generated from a narrow and a wide source font.

The narrow and wide source fonts "h" have the same height dimension Y and the same number of defining curve segments. The defining curves of a font result in a font design. The defining curve segments of the letter "h" of FIGS. 1 to 3 are the arc 10A and the line 10L. Generally the source fonts are constructed so that a linear interpolation between the widths of the narrow and the wide source fonts will yield source fonts with bounding boxes having intermediate widths Wi as shown in FIG. 2. Alternatively, instead of interpolation between widths, extrapolation may be used to provide characters having widths beyond the extremes of the narrowest and widest characters in the source fonts.

The different new fonts that are generated from the narrow and wide source fonts will be referred to below as target fonts or reconstructed fonts. Using the linear interpolation method of a preferred embodiment of this invention, it is possible to create target fonts of the complete alphabet or vocabulary of a language or a document wherein all the reconstructed characters have the same stroke thickness, thereby being considered as part of a much larger design space, as will be detailed below in reference to FIG. 6. In addition to matching the stroke thickness metric, the techniques of the invention may also be used to match other metrics of the character or font, such as font weight across the entire source font or x-height of the source font.

FIG. 4 illustrates the fonts of the standard typeface word "humburgerfons" in two different designs. The word in FIG. 4a uses the Adobe Sans design and the word in FIG. 4b uses the ITC Avantgard design in which, for example, the character "a" is drawn with characteristic defining curves which can be differentiated by an untrained eye.

One linear interpolation method for the calculation of the width of a target font is expressed in Eq. 1 as follows.

$$Wi = \frac{Wi - W0}{W1 - W0} \qquad \text{Eq. 1}$$

The terms W0, Wi and W1 have been defined above.

EXAMPLE

The following example will illustrate the method described above. A transmitting FAX machine transmits a document that was prepared using, for example, the Helvetica font shown in FIG. 5b, to a receiving FAX machine. In the prior art, the FAX machine reproduces the document by digital graphic methods, such as raster or bit-map graphics, which involve considerable computation and take an expensive and large memory space. However, using a receiving FAX machine which incorporates the present invention, the receiving FAX machine needs to store only the narrowest and the widest source fonts, which do not have to be Helvetica in all the design aspects of the font. If extrapolation is used, an intermediate group of source font widths may be stored. The target fonts of this example are shown in FIG. 5a. The method requires that the receiving FAX machine store in its memory the narrow source font with a width narrower than the corresponding Helvetica character, and also the wide source font with a width wider than the corresponding Helvetica character.

When the receiving FAX machine detects at its input a document for printing, and the document (or portion thereof) has been prepared with the Helvetica font, the Helvetica font is identified as the input font. The characters of the document are taken in order and identified, and a corresponding target character is reproduced for the printed document using the source font or fonts. For example, if the first input character is "b", the receiving FAX machine will measure the width of the input character "b" and assign to it the intermediate width Wi of Eq. 1, discussed above. A computing means such as a microprocessor in the receiving FAX machine is used to reconstruct the target character "b", having a width Wi, from the source font using the known narrow and wide source fonts in accordance with Eq. 1. Since the target character is reconstructed from a known aesthetic design and with a predetermined weight, x-height and/or stroke thickness, it will be aesthetically pleasing to the eye. Methods of constructing characters using intermediate font widths are described in U.S. Pat. No. 4,933,866 and in an article published in Typografische Monatsblätter TM2, 1980, entitled "Ikarus: computer-gesteuerte Vorlagenerstellung für Foto-, CRT-und Lasersatz".

The process is repeated on-the-fly for all the characters in the document until it is entirely reconstructed using target fonts only. It does not matter if the input font changes in the middle of the document, as long as the receiving FAX machine or the computer (which preferably is part of the FAX machine) can calculate the character width of each input character. Thereafter the document may be printed, displayed or stored in a memory.

As was discussed above, using this linear interpolation or extrapolation method, it is possible to create target fonts of the complete alphabet or vocabulary of a language or a document wherein all the characters have the same stroke thickness, weight, x-height or CMY combination of these, and thereby can be considered as part of a much larger design space. FIG. 6 illustrates eight columns of intermediate widths labelled TC1-TC8 for the characters of the english alphabet that were generated from the narrow left column labelled "NSC" and from the wide source column labelled "WSC". The ten columns were generated from the font illustrated in FIG. 5a.

Those skilled in the art of typesetting will recognize that a document can contain multiple fonts, each of which is converted according to the invention. Furthermore, a word or a sentence can be written as a combination of characters from any of the columns of FIG. 5a to produce a desired aesthetic effect to make reading of a document easier. In printing a newspaper, for example, this feature may be used to fit a word into a space of a given column in the situation where page design otherwise would require editorial modification of the text.

The preferred embodiments of the invention have now been described. Various substitution and alterations will be apparent to persons skilled in the art apprised of the teaching of this patent. It is therefor not intended that the invention be limited to the described embodiments, but only as defined by the appended claims.

I claim:

1. A method for reconstructing characters in a document, which are expressed in one or more fonts, to convert said characters to a different font designed to closely match characters from a plurality of fonts in an aesthetically pleasing manner, comprising:

selecting a first character from said document determining the width of said first character;

based upon this width determination, substituting for said first character the same character constructed from said different font and having the same width as said first character, the characters of varying widths within said different font being designed to have aesthetically pleasing relationships between their parts irrespective of width;

continuing the construction and substitution of characters of said different font for each of the characters in said document needing reconstruction in the same manner until all the characters in said document needing reconstruction have been substituted, thereby creating a reconstructed document having aesthetically pleasing relationship among the characters in said document; and storing said reconstructed document for subsequent display.

2. The method of claim 1 wherein the characters of said different font have a constant stroke thickness over a broad range of character widths.

3. The method of claim 2 wherein the characters of said different font have the same defining curve segments.

4. The method of claim 2 wherein the characters of said different font have a weight which matches the weight of the font of the corresponding characters in said document.

5. The method of claim 2 wherein the characters of said different font have an x-height which matches the x-height of the font of the corresponding characters in said document.

6. The method of claim 1 wherein the characters of said different font have the same defining curve segments.

7. The method of claim 1 wherein the characters of said different font have a weight which matches the weight of the font of the corresponding characters in said document.

8. The method of claim 1 wherein the characters of said different font have an x-height which matches the x-height of the font of the corresponding characters in said document.

* * * * *

UNITED STATES PATENT AND TRADEMARK OFFICE
CERTIFICATE OF CORRECTION

PATENT NO. : 5,185,818
DATED : February 9, 1993
INVENTOR(S) : Warnock

It is certified that error appears in the above-indentified patent and that said Letters Patent is hereby corrected as shown below:

Col. 01, line 36     after "problem"     insert --.--
Col. 01, line 39     after "font"     insert --.--
Col. 05, line 04     delete "2"     insert --1--

Signed and Sealed this

Fourth Day of October, 1994

Attest:

BRUCE LEHMAN

Attesting Officer     Commissioner of Patents and Trademarks